(12) United States Patent  
Chou et al.

(10) Patent No.: US 7,796,492 B2  
(45) Date of Patent: Sep. 14, 2010

(54) DOUBLE ELECTRODE CANTILEVER ACTUATION FOR SEEK-SCAN-PROBE DATA ACCESS

(75) Inventors: Tsung-Kuan Allen Chou, San Jose, CA (US); Qing Ma, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 11/823,214

(22) Filed: Jun. 27, 2007

(65) Prior Publication Data

US 2009/0002887 A1     Jan. 1, 2009

(51) Int. Cl.  
*G11B 9/00*     (2006.01)

(52) U.S. Cl. ....................................... 369/126

(58) Field of Classification Search ........................ None  
See application file for complete search history.

(56) References Cited

U.S. PATENT DOCUMENTS

| | | | |
|---|---|---|---|
| 7,176,457 B2 * | 2/2007 | Wen et al. | 250/306 |
| 7,547,883 B2 | 6/2009 | Chou | |
| 2006/0228873 A1 * | 10/2006 | Liu et al. | 438/496 |
| 2006/0260388 A1 * | 11/2006 | Su et al. | 73/105 |
| 2007/0291623 A1 * | 12/2007 | Belov et al. | 369/126 |
| 2008/0148879 A1 * | 6/2008 | Chou | 73/866.5 |

* cited by examiner

*Primary Examiner*—Paul Huber  
(74) *Attorney, Agent, or Firm*—Winkle, PLLC

(57) ABSTRACT

A seek-scan-probe memory device, utilizing a media electrode to allow active cantilevers to contact the storage media, and a pull electrode to pull up cantilevers away from the storage media when in an inactive mode. Other embodiments are described and claimed.

2 Claims, 2 Drawing Sheets

DOUBLE ELECTRODE CANTILEVER ACTUATION FOR SEEK-SCAN-PROBE DATA ACCESS

FIELD

The present invention relates to MEMS memory devices, and more particularly, to seek-scan-probe memory storage devices.

BACKGROUND

FIG. 1 illustrates a prior art, conventional MEMS (Micro-Electro-Mechanical System) seek-scan-probe (SSP) memory device, where various components are labeled by their typical names. For simplicity, only two cantilevers are shown in FIG. 1, but in practice there is an array of cantilevers. The storage media comprises a Chalcogenide. However, other media may be used for storage, such as ferroelectric material. Electrical energy (heat) converts a Chalcogenide between its crystalline (conductive) and amorphous (resistive) phases, so that information may be stored, and read by sensing current through the storage media. The cantilever array is on a stage mover. The cantilever array may be moved laterally so that a data bit may be stored or read spatially. Each cantilever covers a specific region of the storage media to perform read, write, and erase operations over the specific region.

To perform a read, write, or erase operation, the tip of the active cantilever needs to contact the storage media so that current can flow between the tip and the media electrode underneath the storage media for resistance sensing (read operation) or electrical current passing (write and erase operations). The read, write, or erase action is performed with a pulse voltage, e.g., ground to 8 volts, applied on the media electrode with a typical duration of about 20 nano-seconds (ns). The cantilever mechanical response is insensitive to such a fast electrical pulse. The tip contact with the storage media is mainly achieved by the cantilever's bending from internal stress.

Due to process variation on the wafer, the stress-induced bending may vary significantly from cantilever to cantilever, resulting in situations in which some cantilevers are in contact with the storage media while some have inadequate bending to reach the storage media surface. In order to make sure that all cantilevers are contacting the storage media, the gap between the mover and storage media surface is usually reduced to obtain adequate contact force on the least-bent cantilevers. However, this may damage the cantilever tips.

DESCRIPTION OF EMBODIMENTS

In the description that follows, the scope of the term "some embodiments" is not to be so limited as to mean more than one embodiment, but rather, the scope may include one embodiment, more than one embodiment, or perhaps all embodiments.

Figure 1:
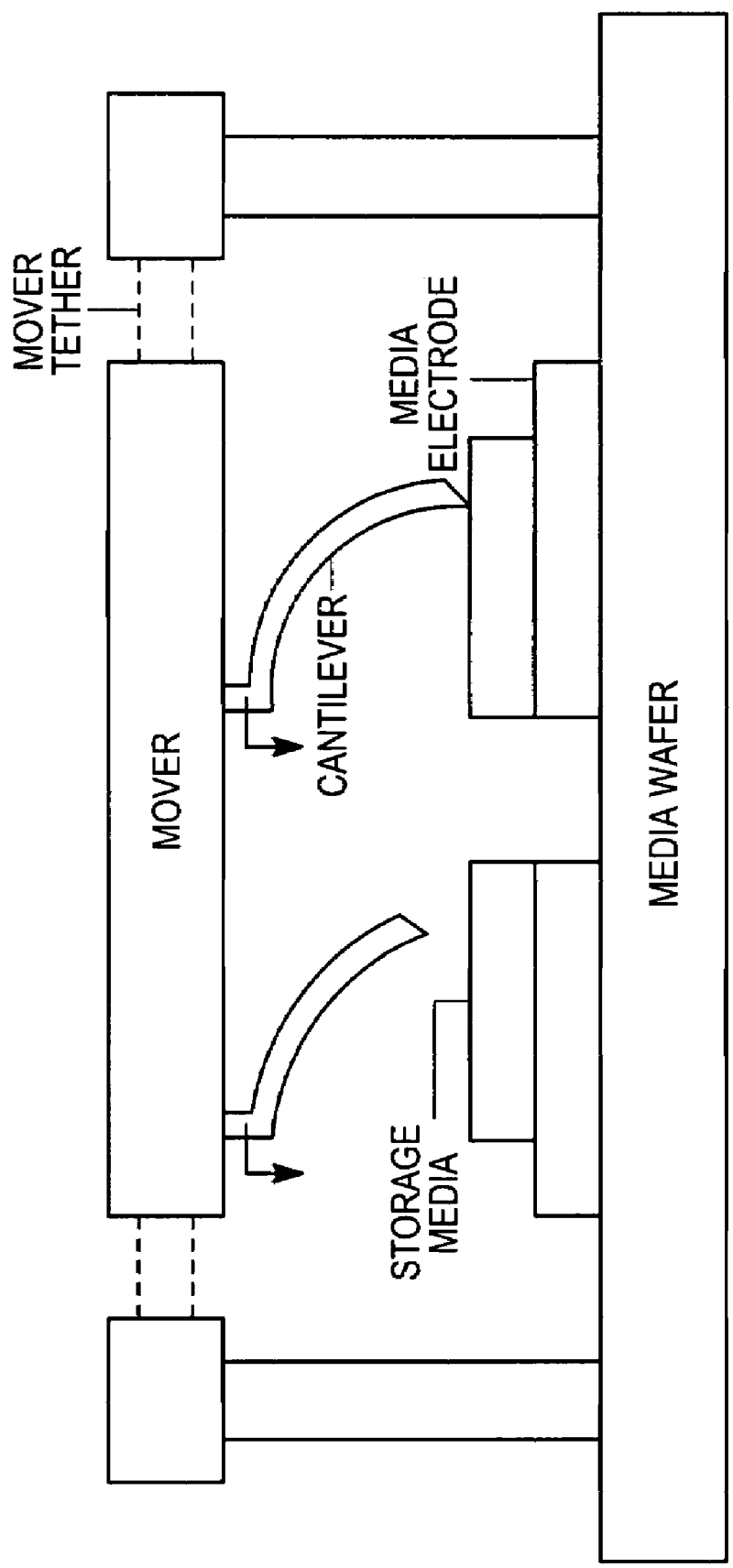
FIG. 1 illustrates a prior art scan-seek-probe memory device.
Figure 2:
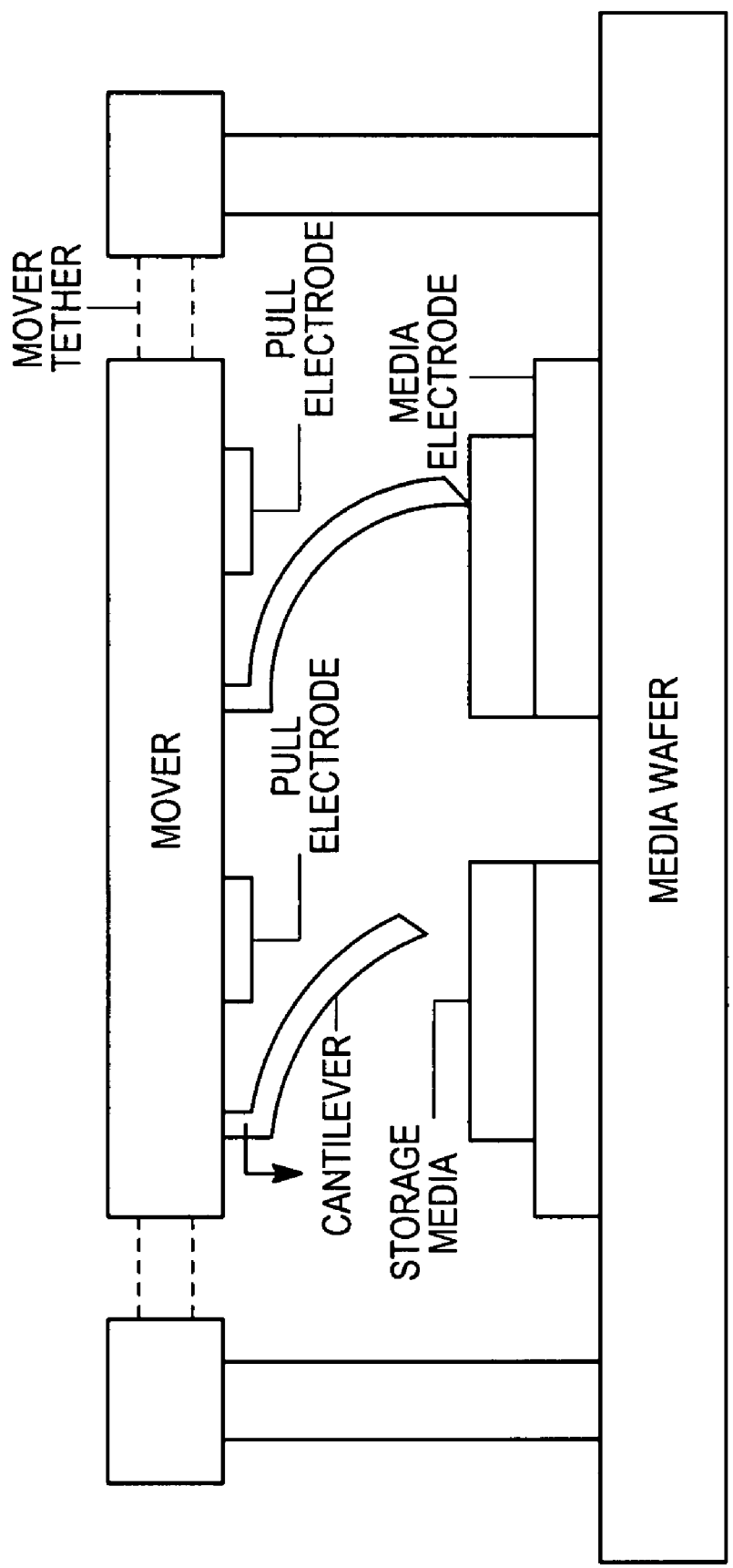
FIG. 2 illustrates a scan-seek-probe memory device according to an embodiment of the present invention.

FIG. 2 illustrates in simplified form a side-view of an embodiment. For simplicity, only two cantilevers are shown, but in practice an array of cantilevers are used to store, read, and erase bits on the storage media. Each cantilever is sandwiched by two actuation electrodes, a media electrode and another electrode on the mover, which is referred to as a pull electrode in FIG. 2. Each media electrode and its corresponding pull electrode are separated by an air gap. A pull electrode is located at the backside of its corresponding cantilever, and allows the cantilever to be actuated upwards. The media electrode serves as the front actuation electrode of its corresponding cantilever to increase contact force with the storage media. For some embodiments, when the electrodes are powered off (no actuation), the cantilevers contact the storage media with forces ranging from about 0 to 25 nN.

For some embodiments, the cantilevers comprise a relatively compliant beam to allow acceptable force variation caused by process variation. For example, for a cantilever beam of compliance (spring constant) $k=0.05N$ and for a variation in the vertical dimension of $\Delta z=0.5$ μm, the force variation is $\Delta F = k\Delta z = 25$ nN. For such embodiments, this relatively small force range is not expected to damage the cantilever tips after a wafer is bonded.

When powered up, the cantilevers are actuated into two groups: a non-active group and an active group. Cantilevers in the non-active group do not perform R/W/E (Read/Write/Erase) actions. The cantilevers in the active group have their tips in contact with the storage media for data access. For a non-active cantilever, a high voltage may be applied on the pull electrode. For example, for some embodiments a voltage of 30V may be applied on the pull electrode, resulting in a pulling force of between 0.1 to 0.2 μN for an assumed gap of 4 μm to 5 μm. For such embodiments, the force is expected to move the tip of a cantilever upwards by 0.5 μm to 1 μm, slightly above the storage media surface, and the applied voltage is expected to produce an electrostatic force in balance with the cantilever spring, but not so large as to cause pull-in of the cantilever onto the pull electrode. In this way, the cantilever is suspended between the over and media wafer. Because the tips are only slightly above the storage media, the non-active cantilevers may be made active and contact the storage media surface when the pull voltage is removed.

For active cantilevers, no voltage need be applied on the pull electrode. For some embodiments, the active cantilevers contact the storage media surface with a force in the range of 0 nN to 25 nN, depending on the initial bending due to process variation. For cantilevers with close to zero spring contact force, an additional actuation may be used to boost the contact force. For example, a low voltage may be applied on the media electrode to produce an additional attracting force between the cantilever tip and the storage media. For example, for a 0.3 μm tip height, an electrostatic force of about 50 nN to 100 nN may be produced by applying 2V on the media electrode. This low voltage on the media electrode is essentially invisible to the phase change storage media, which usually requires a voltage larger than 7V to cause a phase change. Typically, the storage media has a very high resistance, in the neighborhood of 100 kΩ between the tip and media electrode, so that a low actuation voltage may be maintained if needed.

The total contact force is the sum of the spring force and electrostatic force from the media electrode. By adjusting the voltage on the media electrode, the tip contact force may be modulated, for example, from 25 nN to more than 100 nN. The R/W/E action with a short electrical pulse ($V_s > 7V$ and less than 100 ns in duration) may be performed when the desired contact force is achieved. The very short pulse from the R/W/E action should have minimum effect on the cantilever. When a cantilever completes a data access, the media electrode voltage is removed and a high voltage is applied on the pull electrode to open the cantilevers, that is, pull the tip upwards so that the cantilever is in a non-active mode.

Because only the active cantilevers are contacting with the storage media during data access, it is expected that tip and storage media wear should be reduced for the non-active cantilevers. It is also expected that this may improve reliability and lifetime of the device.

Various modifications may be made to the described embodiments without departing from the scope of the invention as claimed below. For example, the spring constant need not be uniform throughout a cantilever. For example, some embodiments may have cantilevers such that over their length closest to the mover, the spring constant is higher than for a portion of their length closest to the storage media.

What is claimed is:

1. A method to provide data access in a seek-scan-probe memory device, the device comprising an array of pull electrodes, an array of cantilevers, an array of media electrodes, and a storage media, the method comprising:

applying a voltage to a first group of pull electrodes in the array of pull electrodes to cause a first group of cantilevers in the array of cantilevers to not contact the storage media, where associated with the first group of cantilevers is a first group of media electrodes in the array of media electrodes; and applying a voltage to those media electrodes in the array of media electrodes not in the first group to cause those cantilevers in the array of cantilevers not in the first group to contact the storage media.

2. The method as set forth in claim 1, wherein in applying a voltage to those media electrodes in the array of media electrodes not in the first group to cause those cantilevers in the array of cantilevers not in the first group to contact the storage media, the applied voltage is adjusted to control a final contact force of the cantilevers in the array of cantilevers not in the first group.

* * * * *